United States Patent [19]
Burkhart et al.

[11] Patent Number: 5,357,018
[45] Date of Patent: Oct. 18, 1994

[54] POLYSILOXANE-POLYOXYALKYLENE BLOCK COPOLYMERS WITH DIFFERENT POLYOXYALKYLENE BLOCKS IN THE AVERAGE MOLECULE

[75] Inventors: Georg Burkhart, Essen; Rolf-Dieter Langenhagen, Hattingen; Andreas Weier, Essen; Volker Zellmer, Bottrop, all of Fed. Rep. of Germany

[73] Assignee: Th. Goldschmidt AG, Essen, Fed. Rep. of Germany

[21] Appl. No.: 175,043

[22] Filed: Dec. 29, 1993

Related U.S. Application Data

[62] Division of Ser. No. 144,990, Oct. 29, 1993.

[30] Foreign Application Priority Data

Nov. 20, 1992 [DE] Fed. Rep. of Germany ....... 4239054

[51] Int. Cl.$^5$ .............................................. C08G 77/46
[52] U.S. Cl. ........................................ 528/15; 528/25; 528/29; 528/31; 556/446; 556/457
[58] Field of Search ..................... 528/15, 29, 25, 31; 556/446, 457

[56] References Cited

U.S. PATENT DOCUMENTS

| | | | |
|---|---|---|---|
| 3,565,845 | 2/1971 | Johnson | 528/15 |
| 3,600,418 | 8/1971 | Bailey et al. | 556/446 |
| 4,886,551 | 12/1989 | Fink et al. | 556/446 |

*Primary Examiner*—Melvyn I. Marquis
*Attorney, Agent, or Firm*—Anderson Kill Olick & Oshinsky

[57] ABSTRACT

Polysiloxane-polyoxyalkylene block copolymers, which are intended for the production of polyurethane foams, are prepared. The foams obtained have an improved, finer cell structure and the collapse of the foams is reduced. It is essential for the invention that a mixture of polyoxyalkylene groups is present in the polysiloxane-polyoxyalkylene block copolymers. Further particulars are laid down for selecting the different polyoxyalkylene groups with regard to the respective molecular weights and the ratio of polyoxyalkylene groups to one another.

6 Claims, No Drawings

POLYSILOXANE-POLYOXYALKYLENE BLOCK COPOLYMERS WITH DIFFERENT POLYOXYALKYLENE BLOCKS IN THE AVERAGE MOLECULE

This is a divisional application of Ser. No. 08/144,990, filed Oct. 29, 1993, now pending.

FIELD OF THE INVENTION

The invention relates to polysiloxane-polyoxyalkylene block copolymers with different polyoxyalkylene blocks in average molecule and to their use in the production of polyurethane foams.

BACKGROUND INFORMATION AND PRIOR ART

For producing polyurethane foams, polysiloxanepolyoxyalkylene block copolymers are added to the mixture of reaction products. Said copolymers enable a uniform pore structure to be formed and stabilize the foam formed up to the end of the reaction. However, not all polysiloxane-polyoxyalkylene block copolymers are suitable in the same way. In order to be useful as polyurethane foam stabilizers, the polyoxyalkylene and the polysiloxane blocks of the block copolymer must be present in a well-balanced ratio, the structure of the two blocks also being of great importance. For the structure of an as effective as possible foam stabilizer, there is a plurality of variables for the polyoxyalkylene block as well as for the polysiloxane block.

The polyoxyalkylene block can be composed of different oxyalkylene units, particularly of oxyethylene, oxypropylene and oxybutylene units. The weight ratio of these units to one another, as well as the molecular weight of the polyoxyalkylene block can be varied. Of importance is also the end group of the polyoxyalkylene block, which can be reactive with respect to the polyurethane formation (for example, OH group) or inert (for example, alkoxy group). The polyoxyalkylene block can be linked to the polysiloxane block by a hydrolytically stable C-Si bond or by the hydrolytically less stable C-O-Si bond. Different polyoxyalkylene blocks can also be linked to the polysiloxane block.

The polysiloxane block can be varied with respect to the nature and proportion of the silicon units. The siloxane block can be linear or branched and have different molecular weights. The polyoxyalkylene block can be linked terminally and/or laterally to the polysiloxane block.

Only to a certain extent can. the effectiveness of a Polysiloxane-polyoxyalkylene block copolymer as a foam stabilizer be predicted. The expert is therefore required to test the possible variations largely empirically. In view of the large, practically indeterminable number of possible variations, the finding of special variation possibilities and of appropriate block copolymers represents a progress-amassing and thus inventive effort.

Polysiloxane-polyoxyalkylene block copolymers, which have different polyoxyalkylene groups in the average molecule, have already been described repeatedly. The following publications are named as being representative of the large number of appropriate publications:

German Patent 15 70 647: Chloropolysiloxanyl sulfates are reacted with mixtures of alkylene oxide adducts, which consist of 50 to 95 OH-equivalent percent of polyalkylene glycol monoethers, which consist of ethylene oxide and propylene oxide units and contain 40 to 70% by weight of oxypropylene units and have a molecular weight of 1,000 to 3,000 and the hydroxyl groups of which preferably are secondary, and 5 to 50 OH-equivalent percent of aikylene oxide adducts of polyhydric hydroxyl compounds with a molecular weight of 130 to 3,500, the polyalkylene glycol components of which consist of ethylene oxide and/or propylene oxide units and which have an OH equivalent weight up to 1,750 and the hydroxyl groups of which preferably are secondary, the quantitative ratio being selected so that there are at most 1.4 and preferably 1.05 to 1.2 OH-equivalents per acid equivalent of the chloropolysiloxanyl sulfate.

German Pat. 16 94 366: The polysiloxanepolyoxyalkylene block copolymers are used as foam stabilizers, the polysiloxane block of which has a known structure, but the polyoxyalkylene block of which consists of 25 to 70% by weight of a polyoxyalkylene with an average molecular weight of 1,600 to 4,000 and an ethylene oxide content of 20 to 100% by weight, the remainder being propylene oxide and optionally higher alkylene oxides, and 30 to 75% by weight of a polyoxyalkylene with an average molecular weight of 400 to 1,200 and an ethylene oxide content of 65 to 100% by weight, the remainder being propylene oxide and optionally higher alkylene oxides.

German Offeniegungsschrift 25 41 865: The polysiloxanepolyoxyalkylene block copolymers are defined with respect to their polyoxyalkylene blocks, so that the one polyoxyalkylene block has an average molecular weight of 900 to 1,300 and consists of 30 to 55% by weight of ethylene oxide, the remainder being propylene oxide, and the other polyoxyalkylene block has an average molecular weight of 3,800 to 5,000 and consists of 30 to 50% of ethylene oxide, the remainder being propylene oxide.

European Publication 0 275 563: The block copolymer, described in this published European patent application, comprises three different polyoxyalkylene blocks, namely one block, which contains 20 to 60% by weight of oxyethylene units with a molecular weight of 3,000 to 5,500, a further block with 20 to 60% by weight of oxyethylene units and a molecular weight of 800 to 2,900 and a third block, which contains only polyoxypropylene units and has a molecular weight of 130 to 1,200.

OBJECT OF THE INVENTION

An object of the invention is polysiloxanepolyoxyalkylene block copolymer, the application properties of which are optimized further, a particular effort being made to find a stabilizer of high activity, which permits flexible polyurethane foams of very good cell fineness to be produced even in the lower density range.

SHORT DESCRIPTION OF THE INVENTION

This improvement in properties is found in those polysiloxane-polyoxyalkylene block copolymers which, pursuant to the invention, correspond to the following general, average formula:

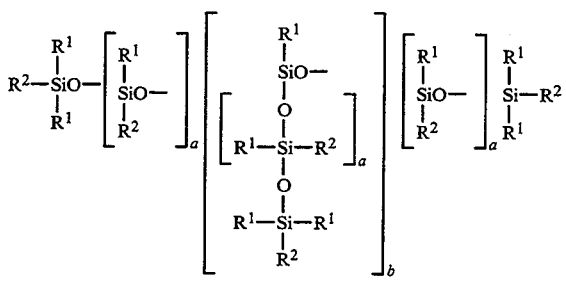

wherein $R^1$ is an alkyl group with 1 to 4 carbon atoms or a phenyl group, with the proviso that at least 90% of the $R^1$ groups are methyl groups, $R^2$ has the same meaning as the $R^1$ group or represents the $-R^4_xO-R^3$ group, wherein $R^4$ is a divalent alkylene group, which may also be branched, x has a value of 0 or 1 and $R^3$ is a mixture of
- at least one polyoxyalkylene group A with an average molecular weight of 350 to 6,000, consisting of >90 to 100% by weight of oxyethylene units and 0 to <10% by weight of oxypropylene units,
- (b) at least one polyoxyalkylene group B with an average molecular weight of 700 to 5,500, consisting of 30 to 90% by weight of oxyethylene units and 70 to 10% by weight of oxypropylene units, and, optionally
- (c) one or several polyoxyalkylene group(s) C with an average molecular weight of 500 to 5,000, consisting of 0 to <30% by weight of oxyethylene units and 100 to >70% by weight of oxypropylene units, with the proviso that
(1) there is at least one $-R^4_xOR^3$ group in an average block copolymer,
(2) there are at least 3 polyoxyalkylene groups of different average molecular weight and/or different oxyethylene content in the average block copolymer, and
(3) if no polyoxyalkylene group C is present, the polyoxyalkylene group A has an average molecular weight of not less than 700, and
(4) if polyoxyalkylene groups A and C are present, at least one of these groups has an average molecular weight of not less than 700,
(5) the ratio of polyoxyalkylene groups A : B: C (in mole %) is 5 to 60: 10 to 95: 0 to 80, the sum of the mole percentages adding up to 100, has a value of 0 to 10,
has a value of 10 to 100, when b=0, or
has a value of 3 to 70, when b>0 and ≦4, or
has a value of 3 to 30, when b>4.

Up to 20% by weight of the oxypropylene units in the polyoxyalkylene groups B and C can be replaced in each case by oxybutylene units.

The $R^1$ group preferably is a methyl group.

The $R^4$ group preferably is a group having the formula $-(CH_2)_2-$ or $-(CH_2)_3-$.

Preferably, the $R^3$ polyoxyalkylene groups correspond to the formula $(C_mH_{2m}O-)_nR^5$, the subscripts n and m being selected so that the conditions with respect to the composition and the respective molecular weight of the different polyoxyalkylene groups are fulfilled, and $R^5$ is a hydrogen group, an alkyl group with 1 to 4 carbon atoms, an acyl group or an $-O-CO-NH-R^6$ group, wherein $R^6$ is an alkyl group with 2 to 6 carbon atoms or an aryl group, preferably a phenyl group. The different oxyalkylene groups can be distributed randomly or blockwise.

The following are the preferred ranges for the polyoxyalkylene groups:

| polyoxyalkylene group A: | |
|---|---|
| average molecular weight | 350 to 2,000 |
| oxyethylene content | 95 to 100 |
| oxypropylene content | 5 to 0 |
| polyoxyalkylene group B: | |
| average molecular weight | 1,300 to 4,500 |
| oxyethylene content | 40 to 70 |
| oxypropylene content and optional oxybutylene content | 60 to 30 |
| polyoxyalkylene group C: | |
| average molecular weight | 800 to 2,500 |
| oxyethylene content | 0 to 20 |
| oxypropylene content and optional oxybutylene content | 100 to 80 |

There must be at least 3 polyoxyalkylene groups of different average molecular weight and/or different oxyethylene content in the average block copolymer. For the case that no polyoxyalkylene group C is present, this means that either at least 2 polyoxyalkylene groups A and 1 polyoxyalkylene group B or at least 1 polyoxyalkylene group A and 2 polyoxyalkylene groups B must be present, which must fall within the scope of the definitions (a) and (b) with respect to their average molecular weight and/or their oxyethylene content.

Moreover, conditions (3) and (4) apply, according to which
(3) the average molecular weight of the polyoxyalkylene group A must not be less than 700 when no polyoxyalkylene group C is present, and
(4) the average molecular weight of at least one of these groups must not be less than 700 when polyoxyalkylene groups A and C are present.

The molecular weight conditions of the A, B and C groups are illustrated in the following Table:

| Polyoxyalkylene | Molecular Weight Range of the Groups | | |
| Groups Present | A | B | C |
|---|---|---|---|
| A and B | 700–6000 | 700–5500 | |
| A, B and C | 700–6000 | 700–5500 | 500–5000 |
| or | 350–6000 | 700–5500 | 700–5000 |

The ratio of the polyoxyalkylene groups A : B : C (in mole percent) is 5 to 60: 10 to 95: 0 to 80, the sum of the mole percentages having to add up to 100.

Preferably, the ratio of A : B : C is 5 to 40 : 20 to 40 to 75, the sum of the mole percentages having to add up to 100. Particularly preferred ratio is 10 to 30: 20 to 40: 50 to 75, the mole percentages adding up to 100.

The inventive block copolymers can be produced by known methods. If the Polyoxyalkylene block are linked by an SiC bond to the polysiloxane backbone, polyoxyalkylene ethers of alcohols with an olefinic double bond are added to an SiH group of a hydrogensiloxane in the presence of hydrosilylation catalysts, particularly platinum catalysts. If the polyoxyalkylene blocks are linked to the polysiloxane backbone by an SiOC bond, chloropolysiloxanyl sulfates are reacted with polyether monools with neutralization of the mineral acid that is set free. It is also possible to transesterify the appropriate alkoxysiloxanes with polyether monools. Appropriate synthesis methods are described in the literature cited above.

The inventive polysiloxane-polyoxyalkylene block copolymers have outstanding application properties and can also be used in combination with other stabilizers of the state of the art. The flexible foams, produced with these polymers as foam stabilizers, exhibit an excellent ratio of cell fineness to stabilization.

They are used in the usual amounts of, for example, 0.3 to 2.5% by weight, based on the polyol, and preferably, of 0.8 to 1.5% by weight, for the preparation of polyurethane foams.

In the following Examples, the application properties of the inventive polymers are explained in even greater detail, it being understood that these examples are provided by way of illustration and not by way of limitation.

Example 1

Into a flask, equipped with stirrer, thermometer, gas inlet and stillhead, 37.2 g (=0.0188 moles) of a polyether having the average formula $$CH_2=CH-CH_2O-(C_2H_4O-)_{40}(C_3H_6O-)_{26}CH_3$$
(Type A), 17.5 g (=0.0125 moles) of a polyether having the average formula $$CH_2=CH-CH_2O-(C_2H_4O-)_{12}(C_3H_6O-)_{14}H$$
(Type B), 367.5 g (=0.0938 moles) of a polyether having the average formula $$CH_2=CH-CH_2O-(C_2H_4O-)_{42}(C_3H_6O-)_{3.4}COCH_3 \text{ (Type B)}$$

and 500 mL of toluene are added. In order to dry the polyether mixture azeotropically, 150 mL of toluene are distilled off under a nitrogen atmosphere. After that, the flask is provided with a reflux condenser and a dropping funnel and nitrogen continues to be passed through the apparatus. At a temperature of about 105° C., 0.3 g of a 10% solution of $H_2PtCl_6.6H_2$ in i-propanol are added and stirred in for 5 minutes. Now 80.4 g (=0.1 moles of SiH) of a siloxane having the average formula $$(CH_3)_3SiO-[(CH_3)_2SiO-]_{58} \quad [(CH_3)HSiO-]_{6}-Si(CH_3)_3$$

are added dropwise over a period of 20 minutes. The reaction is allowed to continue for 4 hours, when an SiH conversion of 99.1% is attained (determined by way of the hydrogen that can be split off in an alkaline medium with n-butanol).

Example 2

Into a flask, equipped with dropping funnel stirrer, thermometer, gas inlet and reflux condenser, 7.5 g (=0.0125 moles) of a polyether having the average formula $$CH_2=CH-CH_2O-(C_2H_4O-)_{12}CH_3 \text{ (Type A)},$$

301.8 g (=0.075 moles) of a polyether having the average formula $$CH_2=CH-CH_2O-(C_2H_4O-)_{45}(C_3H_6O-)_{34}CH_3$$
(Type B), 56.6 g (=0.0375 moles) of a polyether having the average formula $$CH_2=CH-CH_2O-(C_2H_4O-)_5(C_3H_6O-)_{21}CH_3$$
(Type C)

and 16 mg of $C_2H_4.C_5H_5N.PtCl_2$ are added. Nitrogen is passed through the apparatus. After the temperature is raised to 120° C., 65.5 g (=0.1 moles of SiH) of a siloxane with the average formula $$H(CH_3)_2SiO-[(CH_3)_2SiO-]_{80}$$
$$[(CH_3)HSiO-]_8Si(CH_3)_2H$$

are added dropwise. The reaction is allowed to continue for 2.5 hours The SiH conversion is 99.4%.

Example 3

Into a flask, equipped with stirrer, thermometer, gas inlet and reflux condenser, 18.7 g (=0.0188 moles) of a polyether having the average formula $$CH_2=CH-CH_2O-(C_2H_4O-)_{21}CH_3 \text{ (Type A)},$$

35.0 g (=0.025 moles) of a polyether having the average formula $$CH_2=CH-CH_2O-(C_2H_4O-)_{12}(C_3H_6O-)_{14}H$$
(Type B), 75.6 g (=0.25 moles) of a polyether having the average formula $$CH_2=CH-CH_2O-(C_2H_4O-)_{46}(C_3H_6O-)_{16}CH_3$$
(Type B), 84.8 g (=0.0563 moles) of a polyether having the average formula 84.8 g (=0.0563 moles) of a polyether having the average formula $$CH_2=CH-CH_2O-(C_2H_4O-)_1(C_3H_6O-)_{24}CH_3$$
(Type C)

and 87.7 g (=0.1 moles of SiH) of a siloxane formula $$(CH_3)_3SiO-[(CH_3)_2SiO-]_{130}$$
$$[(CH_3)HSiO-]_{12}Si(CH_3)_3$$

are added and nitrogen is passed through the apparatus. After the temperature is raised to 110° C., 12 mg of cis-[PtCl$_2$(NH$_3$)$_2$] are added. After a slightly exothermic reaction, the batch becomes clear. The reaction is allowed to continue for 3.5 hours, after which the SiH conversion is 98.9%,

Example 4

Into a flask, equipped with stirrer, thermometer, gas inlet and stillhead, 23.2 g (=0.0385 moles) of a polyether having the average formula $$C_4H_9O-(C_2H_4O-)_{12}H \text{ (Type A)},$$

22.0 g (=0.0055 moles) of a polyether having the average formula $C_4H_9O-(C_2H_4O-)_{82}(C_3H_6O-)_{5.4}H$ (Type A), 198.2 g (=0.0661 moles) of a polyether having the average formula $C_4H_9O-(-C_2H_4O-)_{23}(C_3H_6O-)_{33}H$ (Type B)

and 1,100 mL of toluene are added. Under a blanket of nitrogen, 150 mL of toluene are distilled off for the azeotropic drying of the polyether mixture. At 50° C., the stillhead is exchanged for a reflux condenser. Subsequently, 65.8 g (=0.1 moles of SiX) of a chloropolysiloxanyl sulfate having the average formula

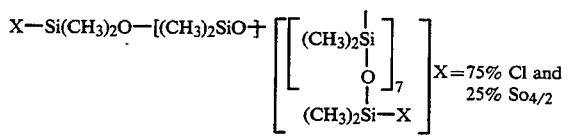

are added. Ammonia gas is then passed in at 60° C., until the contents of the flask react ammoniacally. The reaction is allowed to continue for a further hour while ammonia gas is being passed in slowly. Subsequently, the precipitated salt is filtered off. After that, the toluene is distilled off at 70° C. and 20 mbar.

Example 5

Under the conditions of Example 1, 3.8 g (=0.0063 moles) of a polyether having the average formula $CH_2=CH-CH_2O-(C_2H_4O-)_{12}CH_3$ (Type A), 12.4 g (=0.0063 moles) of a polyether having the average formula $CH_2=CH-CH_2O-(C_2H_4O-)_{40}(C_3H_6O-)_{2.6}CH_3$ (Type A), 46.0 g (=0.0313 moles) of a polyether having the average formula $CH_2=CH-CH_2O-(C_2H_4O-)_{16}(C_3H_6O-)_{12}CH_3$ (Type B), 75.2 g (=0.0188 moles) of a polyether having the average formula $CH_2=CH-CH_2O-(C_2H_4O-)_{45}(C_3H_6O-)_{34}H$ (Type B)

and 94.4 g (=0.0625 moles) of a polyether having the average formula
$CH_2=CH-CH_2O-(C_2H_4O-)_5(C_3H_6O-)_{21}CH_3$ (Type C)

are reacted with 87.7 g (=0.1 moles of SiH) of a siloxane with the average formula $(CH_3)_3SiO-[(CH_3)_2SiO-]_{130}$
$[(CH_3)HSiO-]_6Si(CH_3)_3$ with addition of 400 mL of toluene (of which 150 mL are used for azeotropic drying) in the presence of 0.18 g of a 10% solution of $H_2PtCl_6.6H_2O$ in i-propanol. An SiH conversion of 98.5% is achieved.

Example 6

(not of the invention)
Under the conditions of Example 1, 27.5 g (=0.0438 moles) of a polyether having the average formula $CH_2=CH-CH_2O-(C_2O-(C_2H_2H_4O-)_{23}(C_3H_6O-)_8CH_3$ (Type B), and 327.0 g (=0.0813 moles) of a polyether having the average formula $CH_2=CH-CH_2O-(C_2H_4O-)_{45}(C_3H_6O-)_{34}CH_3$ (Type B)

are reacted with 80.4 g (=0.1 moles of SiH) of a siloxane having the average formula $(CH_3)_3SiO-[(CH_3)_2SiO-]_{58}[(CH_3)HSiO-]_6-Si(CH_3)_3$ with addition of 450 mL of toluene (of which 150 mL are used for azeotropic drying) in the presence of 0.25 g of a 10% solution of $H_2PtCl_6.6H_2O$ in i-propanol. An SiH conversion of 98.8% is achieved.

Example 7

(not of the invention)
Under the conditions of Example 1, 19.4 g (=0.0125 moles) of a polyether having the average formula $CH_2=CH-CH_2O-(C_2H_4O-)_{23}(C_3H_6O-)_8CH_3$ (Type B), 73.6 g (=0.05 moles) of a polyether having the average formula $CH_2=CH-CH_2O-(C_2H_4O-)_{16}(C_3H_6O-)_{12}CH_3$ (Type B)

75.5 g (=0.05 moles) of a polyether having the average formula $CH_2=CH-CH_2O-(C_2H_4O-)_5(C_3H_6O-)_{21}CH_3$ (Type C)

and 32.1 g (=0.0125 moles) of a polyether having the average formula $CH_2=CH-CH_2O-(C_3H_6O-)_{43}CH_3$ (Type C)

are reacted with 87.7 g (=0.1 moles of SiH) of a siloxane having the average formula
$(CH_3)_3SiO-[(CH_3)_2SiO-]_{130}$
$[(CH_3)HSiO-]_{12}Si(CH_3)_3$ with addition of 400 mL of toluene (of which 150 mL are used for azeotropic drying) in the presence of 0.2 g of a 10% solution of $H_2PtCl_6.6H_2O$ in i-propanol. An SiH conversion of 98.4% is achieved.

The application of the foam stabilizers produced was tested with a foam formulation in the following manner:

In each case, 300 parts of a conventional, commercial polyether for the preparation of flexible urethanes, which has three hydroxyl groups in an average molecule and a molecular weight of 3,500, are mixed with good stirring with 15 parts of water, 30 parts of a physical blowing agent, the appropriate amount of the foam stabilizer to be tested, 0.33 parts of diethylenetriamine and 0.6 parts of tin octoate. After the addition of 125 parts of toluene diisocyanate (2,4 and 2,6 isomers mixture in the ratio of 4 : 1), stirring is continued with a smooth stirrer for 7 seconds at 3000 rpm and the mixture is poured into a box. A foam with a fine pore structure is formed, on which the following data are measured:

1. The collapse of the foam at the end of the rising phase (given in the Table below as "collapse").
2. The number of cells per centimeter of foam is counted under a microscope.

In the following Table, three values are given in each case for three different concentrations in the ratio of 1.8 : 1.3 : 1.0 for inventive stabilizers (Examples 1 to 5) as well as for stabilizers not of the invention (Examples 6 and 7).

| Example | Collapse    | Cells per cm |
|---------|-------------|--------------|
| 1       | 0.4/0.7/1.1 | 13/12/12     |
| 2       | 1.0/1.2/1.6 | 15/14/14     |
| 3       | 0.7/0.9/1.2 | 15/15/14     |
| 4       | 1.1/1.3/1.6 | 12/12/12     |
| 5       | 0.3/0.7/0.9 | 15/14/14     |
| 6       | 0.2/0.3/1.9 | 06/05/04     |
| 7       | 2.1/2.5/3.3 | 16/15/13     |

Through the use of the inventive block copolymers as active foam stabilizers for the production of polyurethane foams, it is thus possible to obtain foams with a cell structure, which is distinctly finer than that of foams of the state of the art. At the same time, the collapse is slight.

We claim:

1. A polysiloxane-polyoxyalkylene block copolymer having different polyoxyalkylene blocks in an average molecule, comprising the general formula

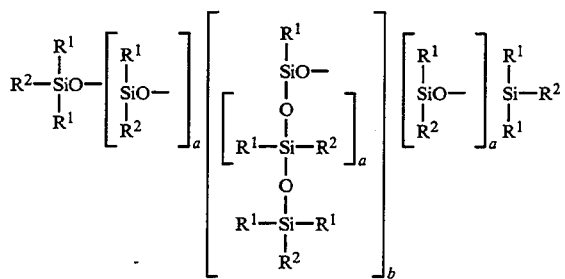

wherein $R^1$ is an alkyl group with 1 to 4 carbon atoms or a phenyl group, with the proviso that at least 90% of the $R^1$ groups are methyl groups, $R^2$ has the same meaning as the $R^1$ group or represents the $-R^4_xO-R^3$ group, wherein $R^4$ is a divalent alkylene group, with or without branches, X has a value of 0 or 1, and $R^3$ is a mixture of (a) at least one polyoxyalkylene group A with an average molecular weight of 350 to 6,000, consisting of >90 to 100% by weight of oxyethylene units and 0 to <10% by weight of oxypropylene units, and (b) at least one polyoxyalkylene group B with an average molecular weight of 700 to 5,500, consisting of 30 to 90% by weight of oxyethylene units and 70 to 10% by weight of oxypropylene units, with the proviso that (1) there is at least one $-R^4_xOR^3$ group in the average block copolymer, (2) there are at least 3 polyoxyalkylene groups of different molecular weight, or different oxyethylene content or both in the average block copolymer, (3) the polyoxyalkylene group A has an average molecular weight of not less than 700, and (5) the ratio of polyoxyalkylene groups A: B (in mole %) is 5 to 60 : 10 to 95 the sum of the mole percentages adding up to 100, b has a value of 0 to 10, has a value of 10 to 100, when b=0, or has a value of 3 to 70, when b>0 and ≦4, or has a value of 3 to 30, when b>4.

2. The block copolymer of claim 1, further comprising that $R^3$ mixture also contains one or several poloxyalkylene groups C having an average molecular weight of 500 to 5,000, consisting of 0 to <30% by weight of oxyethylene units and 100 to >70% by weight of oxypropylene units, with the further proviso that at least one of groups A and C has an average molecular weight of not less than 700, and the ratio of polyoxyalkylene groups A: B : C (in mole %) is 5 to 60 : 10 to 95 : 0 to 80, the sum of the mole percentages adding up to 100.

3. The block copolymer of claim 2, comprising that up to 20% by weight of the oxypropylene units can in each case be replaced by oxybutylene units in the polyoxyalkylene groups B and C.

4. The block copolymer of claims 2 or 3, comprising that the ratio of the polyoxyalkylene groups A: B: C (in mole percent) is 5 to 40: 20 to 60: 40 to 75, the sum of the percentages having to add up to 100 mole percent.

5. The block copolymer of claims 2 or 3, comprising that the ratio of the polyoxyalkylene groups A: B: C (in mole percent) is 10 to 30 : 20 to 40 : 50 to 75, the sum of the percentages having to add up to 100 mole percent.

6. The block copolymer of claim 2 or 3, comprising that the polyoxyalkylene groups A, B and C correspond to the formula $(C_mH_{2m}O-)_nR^5$, subscripts n and m being selected so that the conditions with respect to the composition and the respective molecular weight of the different polyoxyalkylene groups are fulfilled, and $R^5$ being a hydrogen group, an alkyl group with 1 to 4 carbon atoms, an acyl group or an $-O-CO-NH-R^6$ group, wherein $R^6$ is an alkyl group with 2 to 6 carbon atoms or an aryl group.

* * * * *